Figure 1:
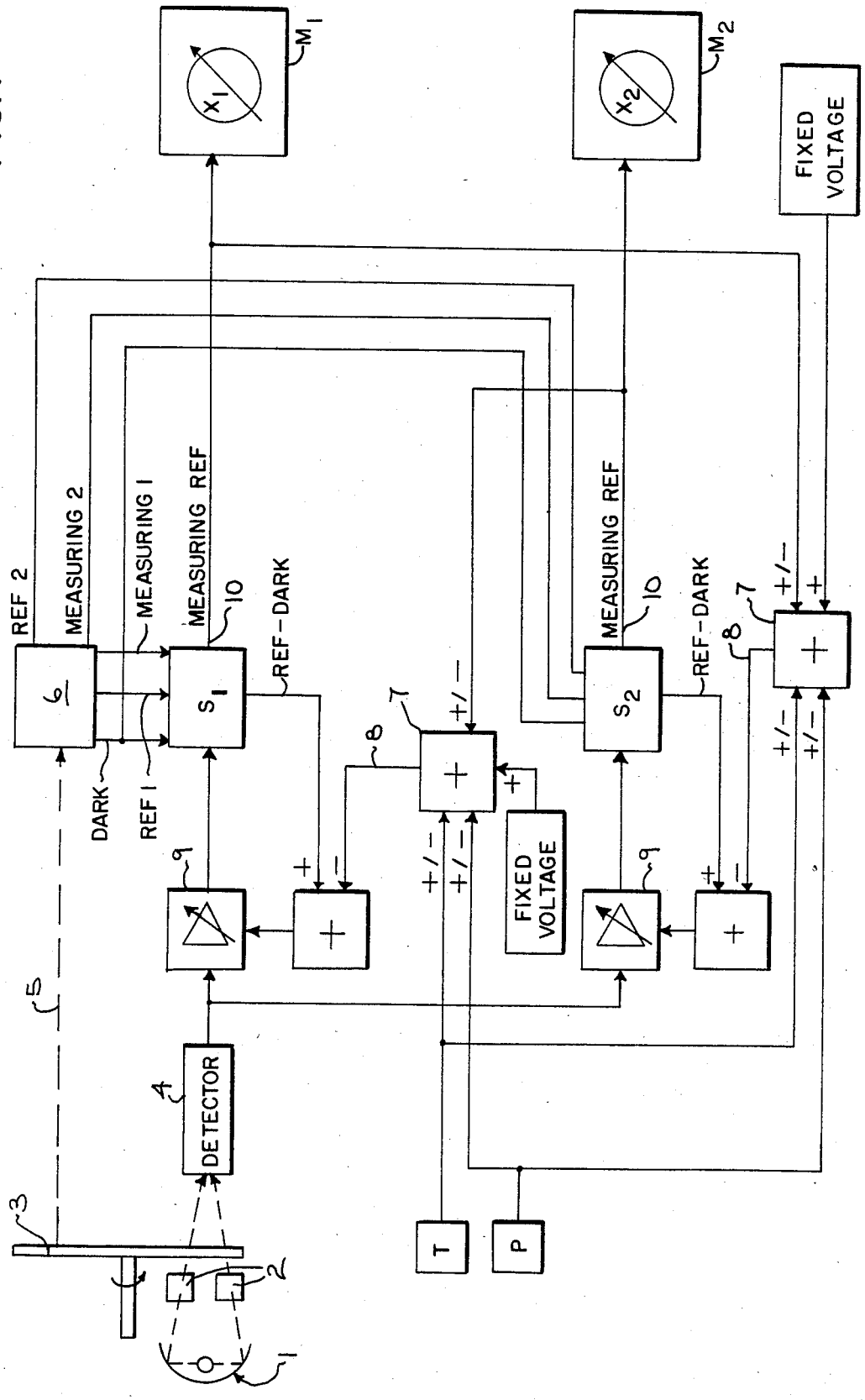

United States Patent [19]
Ehnholm et al.

[11] Patent Number: 4,596,931
[45] Date of Patent: Jun. 24, 1986

[54] METHOD OF ELIMINATING MEASURING ERRORS IN PHOTOMETRIC ANALYSIS

[75] Inventors: Gösta Ehnholm; Matti Hakala, both of Helsinki; Tapio Uimonen, Espoo, all of Finland

[73] Assignee: Instrumentarium Corp., Finland

[21] Appl. No.: 596,295

[22] Filed: Apr. 3, 1984

[30] Foreign Application Priority Data

Apr. 6, 1983 [FI] Finland .................................. 831161

[51] Int. Cl.$^4$ ............................................ G01N 21/26
[52] U.S. Cl. .................................... 250/343; 356/437
[58] Field of Search ....................... 250/343, 345, 346; 356/436, 437

[56] References Cited

U.S. PATENT DOCUMENTS

4,153,837  5/1979  Ross .................................... 250/343

Primary Examiner—Janice A. Howell
Attorney, Agent, or Firm—Andrus, Sceales, Starke & Sawall

[57] ABSTRACT

The invention relates to a method of eliminating the effect of temperature, air pressure and/or a disturbing material component or a like parameter in photometric analysis in which is generated a so-called dark signal, the passage of emitted radiation for detection being blocked at that time, a reference signal for one or more material components to be measured, said reference signal not being affected by said material component to be measured, as well as for each material component to be measured a measuring signal representing the amount of material component to be measured. According to the invention, whenever the difference between a reference signal and a measuring signal changes due to a change in any of the above parameters, there is generated a control signal which represents said parametric change and is proportional thereto, said control signal serving to change the difference between a reference signal and a dark signal in order to compensate for said parametric change. The material components to be measured may preferably comprise $CO_2$, $N_2O$ and/or one or more anesthetic gases.

8 Claims, 1 Drawing Figure

METHOD OF ELIMINATING MEASURING ERRORS IN PHOTOMETRIC ANALYSIS

The present invention relates to a method of eliminating the effect of temperature, air pressure and/or a disturbing material component or like parameter in photometric analysis in which is generated a so-called dark signal, the passage of emitted radiation for detection being blocked, a reference signal or one or more material components to be measured, said material components to be measured having no effect on said reference signal, as well as for each material component to be measured a measuring signal representing the amount of material component to be measured.

The prior art analytical devices operating on photometric principle generally employ a comparative measuring principle, in other words, the same detector is generally used to generate a reference signal on which a component to be measured has no effect, and a measuring signal which is dependent on a material to be measured. These signals are generally generated either by using two light rays traveling on different paths, one path being provided with a chamber (reference) cleared of a material to be measured and the other path being provided with a sample chamber (measuring) containing a material to be measured or, on the other hand, by using two different optical filters, one allowing the passage of a wavelength not absorbed by a material to be measured (reference) and the other allowing the passage of a wavelength to which a material to be measured causes substantial absorption (measuring). Further generated is a dark signal for completely blocking passage of the radiation used for measuring to a detector. Generally such equipment is fitted with an automatic gain control circuit for adjusting a reference signal equal to a fixed reference voltage generated in the device.

A general problem in photometric analyzers is that various materials have effect on the measuring result at the same wavelength. This is due to two different factors: first of all, the absorption spectra of such materials are partially overlapping and thus absorb the same wavelengths and, second of all, the materials affect each other's absorption properties (so-called collision broadening). A method of compensating for the former disturbance effect has been disclosed e.g. in U.S. Pat. No. 3,790,797. In the latter case, however, the question is about a phenomenon that affects the device's sensitivity to a material to be measured, so the compensation thereof as set out in the cited Patent would require expensive and sophisticated circuit solutions, such as multiple circuits.

Also the variations of ambient temperature effect changes in the device sensitivity. This can be eliminated by stabilizing the temperature of a measuring unit. However, this requires great heating effect and, since the temperature must be stabilized above the highest ambient temperature, it will be necessary to use expensive cooled infrared detectors. Another approach is to compensate for thermal drift by connecting a temperature-dependent resistance in the feedback loop of an amplifier. This approach is readily adaptable when analysing one substance. On the other hand, the analyzers for several substances require an individual temperature measuring resistance for each substance or material. As these resistances must be mechanically fitted in connection with a measuring unit, the circuitry will also be multiplied. In addition, a single electronic coupling is generally only capable of compensating for one-way drift so, if the direction of drift occurring in the device is reversed, the tuning will be inconvenient and tedious.

A third troublesome factor is the pressure of a gas to be measured which changes readings in a manner that a certain pressure change typically results in a 1,5 . . . 1,8-fold relative change in the output signal of a device. The prior art way of performing pressure compensation for the output signal requires the use of expensive and complicated multiple circuits.

An object of the invention is to provide a method of eliminating in photometric analysis the effect of temperature, air pressure and/or a disturbing material component or a like measurement disturbing parameter in a manner substantially more simple and economic than the prior art methods, said method being particularly well adaptable to photometric analysis of even a plurality of material components, especially respiratory and anesthetic gases. A problem in said respiratory and anesthetic gas measuring applications is namely to have the assembly ready for service as quickly as possible, so that the measurements can be basically performed instantly with sufficient accuracy, the above stabilizing problems becoming more apparent. On the other hand, for example the $CO_2$-gas and $N_2O$ or laughing gas affect each other's absorption, so in the above type of applications such relative effect of substances to be measured must inevitably be corrected.

The invention is characterized in that, whenever the difference between a reference signal and a measuring signal changes due to a change in any of the above parameters, there is generated a control signal which represents said parameter change and is proportional thereto, said control signal serving to change the difference between a reference signal and a dark signal in order to compensate for the change of said parameter. In practice, this can be effected e.g. by generating a direct-current voltage signal, which is proportional to temperature, air pressure and/or content of a disturbing material component or some other like factor and which suitably attenuated and possibly inverted is summed-up in the reference voltage of the signals' gain control circuit for changing the difference between a reference signal and a dark or zero signal as need be. By means of the invention, it is for example possible to effect temperature compensation by one thermistor for an arbitrary number of measurements of various material components, so the adjustment will be as simple as possible. All compensations can be effected in the basic circuitry with slight component additions and, furthermore, it is possible to use low-price standard components as summing-up is a considerably more simple procedure than multiplying by analogue technique.

The invention will now be described in more detail with reference made to the accompanying drawing whose only FIGURE is a diagrammatic view of one solution for the application of a method of the invention.

According to FIG. 1, an infrared lamp 1 emits radiation to chambers 2, one of which contains a gas to be measured having components $X_1$ and $X_2$ to be measured and the other is a reference chamber with said gaseous components $X_1$ and $X_2$ driven away. A rotating radiation breaker disc 3 includes different filters for components $X_1$ and $X_2$ in a manner such that the filter of component $X_1$ allows the passage of a radiation wavelength which is substantially absorbed by component $X_1$ but as little as possible by component $X_2$, and the filter of component $X_2$ accordingly allows the passage of a radiation wavelength which is absorbed by component $X_2$ substantially but by component $X_1$ as poorly as possible.

Breaker disc 3 is adapted to allow radiation alternately through different chambers 2 and different filters to a detector 4 so that obtained from the detector is a dark level or zero level representing signal, at which time said disc 3 does not allow radiation through, a reference signal, a measuring signal for component $X_1$ and a measuring signal for component $X_2$. A control signal 5 serves to supply a synchronizing circuit 6 with information about the position of breaker disc 3 and hence about which signal is at a particular time detected and forwarded by detector 4. For each component $X_1$ and $X_2$ there is provided its own gauge $M_1$ and $M_1$ and for these respectively a synchronous indicator circuit $S_1$ and $S_2$ whose operation is synchronized and controlled by synchronizing circuit 6 in a manner that they indicate measuring and reference signals relating to a proper component. It depends on the filter arrangement of breaker disc 3 whether there is an inherent reference signal obtained for components $X_1$ and $X_2$. This is the case when the radiation passed through the reference chamber is also passed through the filters of components $X_1$ and $X_2$.

The analyzer is also provided with means T for generating a direct-current voltage signal proportional to temperature and means P for respectively generating a direct-current voltage signal proportional to air pressure. These are fed into summing-up circuits 7 which issue control signals 8 in order to compensate for an error caused in the measuring signals by said parametric changes, said compensation being effected by correcting the difference between reference signal and dark signal and by modifying the gain created by signal amplifiers 9.

In case that said components $X_1$ and $X_2$ to be measured affect each other's absorption properties, the output 10 of synchronous indicators $S_1$ and $S_2$ is also connected to said summing-up circuits 7, so that such effect will also be compensated for in addition to temperature and air pressure.

The invention can of course be applied also in other types of analyzer arrangements without a breaker disc and by using different detectors for different components. Also, the number of components to be measured may be more than two or just as well merely one. Thus, the invention is by no means limited to the described embodiment but a plurality of modifications are conceivable within the scope of the annexed claims.

We claim:

1. A method for eliminating the effects of an error producing parameter in the photometric measurement of one or more gaseous components, said method including the steps of:

generating a dark signal establishing a zero level to which other signals used in the measurement are referred;

generating a reference signal for the component being measured, said reference signal not being affected by the component;

comparing said dark signal and said reference signal for establishing a desired signal difference between said signals;

generating a measuring signal responsive to the component being measured, said signal being subject to the effects of the error producing parameter;

comparing the reference signal and the measuring signal to provide an indication of the concentration of the component being measured;

generating an error signal in accordance with the error producing parameter; and altering the signal difference between said dark and reference signals responsive to said error signal for altering said reference signal to eliminate the effect of the error producing parameter in the comparison of the reference signal and the measuring signal.

2. The method as set forth in claim 1 further defined as one for eliminating the effects of at least one of temperature, pressure, and cross absorption property parameters in the photometric measurement.

3. The method as set forth in claim 2 further defined as comparing said dark and reference signal difference with a fixed signal for establishing the level of said reference signal, and as altering the reference signal level to eliminate the effect of the error producing parameter.

4. The method as set forth in claim 2 further defined as one for measuring first and second gaseous components and wherein reference and measuring signals are generated for each of said first and second components and wherein the step of generating the error signal is further defined as generating an error signal in accordance with the concentration of said first component for altering the signal difference between said dark signal and said reference signal for said second component, thereby to eliminate the effects of cross absorption, and as generating an error signal in accordance with the concentration of said second component for altering the signal difference between said dark signal and said reference signal for said first component.

5. The method as set forth in claim 1 wherein said dark and reference signals are subject to amplification and wherein said altering step is further defined as altering the gain of the amplification.

6. The method as set forth in claim 1 further defined as one for measuring carbon dioxide.

7. The method as set forth in claim 1 further defined as one for measuring anaesthetic gases.

8. The method as set forth in the claim 7 further defined as one for measuring $N_2O$.

* * * * *